July 2, 1946. J. W. CONKLIN 2,403,053
REMOTE CONTROL SYSTEM
Filed Nov. 30, 1942
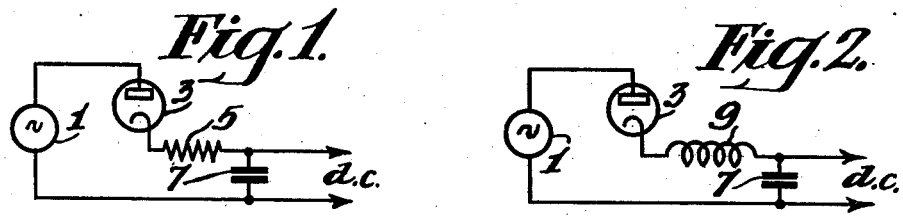
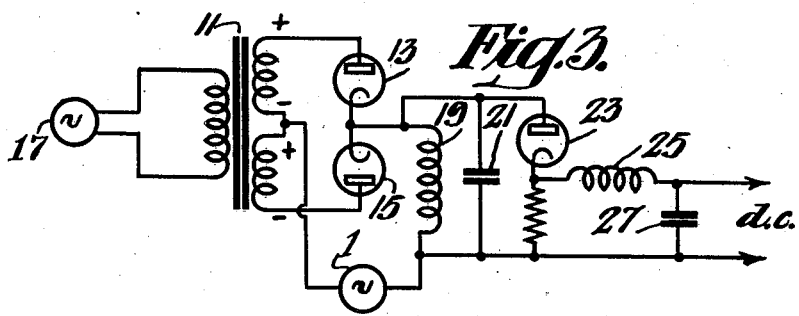
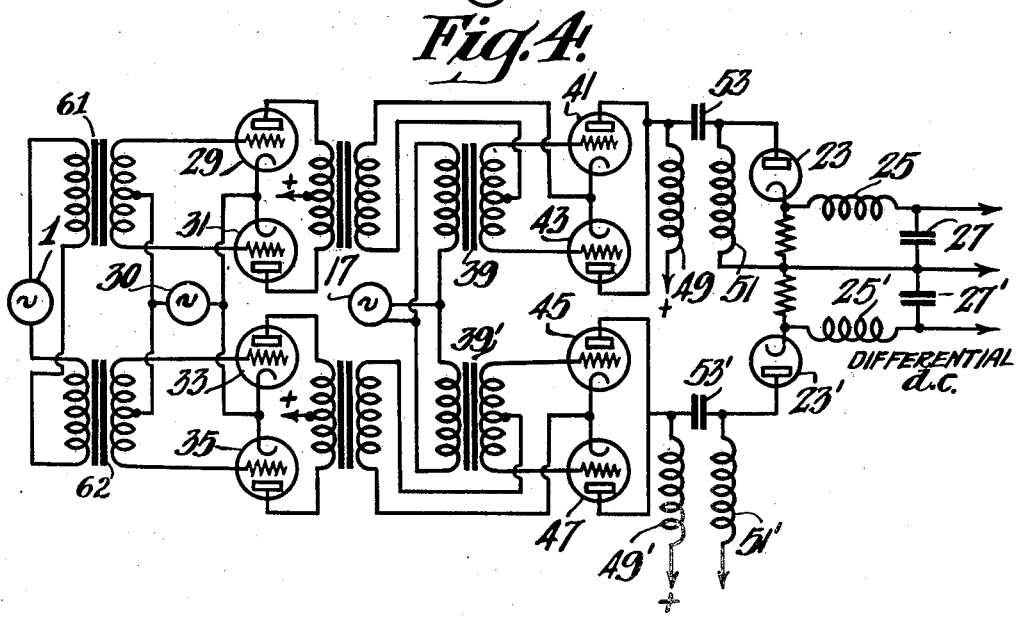

Patented July 2, 1946

2,403,053

UNITED STATES PATENT OFFICE 2,403,053

REMOTE CONTROL SYSTEM

James W. Conklin, Indianapolis, Ind., assignor to Radio Corporation of America, a corporation of Delaware Application November 30, 1942, Serial No. 467,454

5 Claims. (Cl. 175—363)

1

This invention relates to voltage conversion, and more particularly to conversion of an alternating current signal of variable amplitude to a direct current signal having similar variations in its magnitude. Conversion systems of this type find application in electrical control systems wherein an alternating current signal is produced by a control device and the controlled means responds to a D.-C. signal. For example, in electrical servo systems such as that described in U. S. patent application, Serial No. 408,897 entitled Remote control devices, filed August 29, 1941, by J. A. Conklin a synchro type control transformer is operated by the controlling means to vary the amplitude and phase with respect to a reference voltage of an alternating voltage applied to its primary. That is, the output voltage is varied between the limits of +E and —E. This output voltage is amplified, rectified and employed to control a vacuum tube amplifier which provides variable magnitude direct currents for the operation of an electric motor. It is ordinarily necessary to filter the rectified voltage in order to remove the A.-C. ripple before applying it to the controlled amplifier. If the frequency of the original A.-C. signal is, for example, sixty cycles per second, the usual filtering system necessarily introduces a delay of at least 1/120 of a second and usually very much more. This results in undesirable lag of the D.-C. responsive control means over the control signal, and in servo systems which include a follow-up arrangement, hunting or sustained oscillation of the controlled member may take place.

Accordingly it is the principal object of this invention to provide an improved method of and means for deriving variable magnitude direct current voltage in response to variable alternating voltage, with substantially no time delay. Another object is to control a polarity of said D.-C. voltage in response to the instantaneous polarity of the A.-C. signal with respect to a reference alternating current.

These and other objects will become apparent to those skilled in the art upon consideration of the following description, with reference to the accompanying drawing, of which Figs. 1 and 2 are schematic circuit diagrams of prior art rectifier and filter systems, Fig. 3 is a schematic circuit diagram of one embodiment of the present invention, and Fig. 4 is a circuit diagram of a modification of Fig. 3. Similar reference characters are applied to similar elements in the drawing.

It is well known to derive D.-C. control poten-

2 tials from variable amplitude alternating voltages by simple rectification and filtering. One common arrangement of this sort is illustrated in Fig. 1. The alternating current source 1 is connected through a rectifier 3 and a resistor 5 to the output circuit, which is shunted by a capacitor 7. The rectifier conducts alternate half waves from the source 1 charging the condenser 7 and producing a direct current through the utilization circuit. During the negative half cycles of the source 1, the rectifier is nonconducting and the capacitor 7 discharges through the load circuit, maintaining an approximately steady flow of current. The greater the resistance and the greater the capacitance, the more nearly the current approaches a steady flow throughout the A.-C. cycle. However when a change in the amplitude of the input voltage occurs, the average charge of the capacitor 7 must change accordingly in order to provide a corresponding direct voltage to the load. The time required for this change to take place is a function of the constants of the filter circuit and is substantially proportional to the degree to which the filter output approaches a steady direct current. Thus a compromise must be made between the amount of ripple remaining in the output and the time delay with which a change in the amplitude of the input is reflected in a change in the magnitude of the D.-C. output.

Referring to Fig. 2, the resistor 5 may be replaced by an inductor 9. This is also a common type of filter circuit, and is subject to the same limitations as that of Fig. 1 providing, however, somewhat better regulation characteristics. According to the present invention it is proposed to avoid the necessity for compromising between time delay and filter efficiency by providing an auxiliary source of relatively high frequency energy, modulating said high frequency energy with the low frequency signal, and rectifying one of the modulation products. The variations in amplitude of the low frequency are thus transferred to a much higher frequency carrier, and may be separated from the carrier by filter circuits having very short time constants.

Referring to Fig. 3, a source 17 of high frequency current is connected through a push-pull transformer 11 to a pair of rectifiers 13 and 15, connected back to back. The source 1 of variable amplitude control signal is connected to the center tap of the transformer 11 and, through a tuned circuit comprising an inductor 19 and a capacitor 21, to the common cathode circuit of the tubes 13 and 15. A rectifier 23 is connected to the tuned circuit 19, 21 and to a filter circuit comprising an inductor 25 and a capacitor 27. The operation of the system is as follows:

The rectifier tubes 13 and 15 operate as a balanced modulator, modulating the output of the high frequency source 17 with the control signal from the source 1, providing side band voltages across the elements 19, 21, but suppressing the low frequency voltages from the source 1. The circuit 19, 21 is tuned to the frequency of one of these side bands, presenting a relatively low impedance to the other side band. Thus the voltage applied to the rectifier 23 comprises substantially only one side band component of the modulator products. The frequency of this component is either the sum or the difference of the frequencies of the sources 1 and 17, and the amplitude of the component varies according to the variations of the amplitude of the voltage of the source 1. The rectifier 23 and the filter circuit 25, 27 operate in the same manner as the circuit of Fig. 2, with the important difference that the filter 25, 27 need only have a delay characteristic sufficiently long to integrate alternate half cycles of the frequency of the source 17 which may be for example, ten thousand cycles per second or roughly fifteen hundred times that of the source 1. Thus for an equivalent filter efficiency, the delay period is only $\frac{1}{1500}$ as great as if the system of Fig. 2 were employed.

Fig. 4 shows a two channel system providing differential D. C. output. This is required in the system in which "sense" or direction, as well as magnitude of the control signal is used. The source 1 is coupled through transformers 61 and 62 to balanced modulator circuits comprising tubes 29, 31 and 33, 35 respectively. The primary of the transformer 62 is connected in the opposite polarity from the transformer 61. A source 30, of the same frequency as the source 1, but of a constant amplitude and phase is connected between the common cathode circuits and the input transformer center taps. The high frequency source 17 is connected through a push-pull input transformer 39 to a balanced modulator comprising tubes 41 and 43, and similarly through a transformer 39' to a balanced modulator comprising tubes 45, 47. The output of the balanced modulator 29, 31 is applied between the center tap of the transformer 39 and the common cathode circuits of the tubes 41, 43. The modulator 33, 35 is similarly applied to the transformer 39' and the tubes 45 and 47. The anodes of the tubes 41 and 43 are connected together and to a tuned circuit comprising inductors 49 and 51 and a capacitor 53. A rectifier 23 and filter 25, 27 are connected across the inductor 51. The tubes 45 and 47 are similarly connected to a coupling circuit 49', 51', 53' and to a rectifier 23' and hence to a filter 25', 27'.

In operation the modulator 29, 31 provides a signal frequency output related in magnitude to the phase angle between the output of the source 1 and that of the source 30. The output of the modulator 33, 35 is similarly related to the phase angle between the voltages from the sources 1 and 30, but in the opposite direction since the transformer 62 is connected in the opposite polarity from the transformer 61. The output of the modulator 29, 31 modulates that of the source 17 in the modulator 41, 43 in the same manner as the source 1 modulates the sorce 17 in the system of Fig. 3. This provides a D.-C. output across the capacitor 27 of a magnitude related to the phase, as well as the amplitude of the source 1. The second channel including the modulator 45, 47, operates similarly to provide a D.-C. output across the capacitor 27' related to the amplitude of the output of the source 1 in the same manner as the D.-C. voltage across the capacitor 27, but oppositely related to the polarity thereof. Thus the sum of the voltages across the capacitors 27 and 27' is proportional to the amplitude of the output of the device 1; the polarity of the sum voltages is determined by the polarity of the source 1 with respect to that of the reference source 30.

Thus the invention has been described as an improved system for deriving D.-C. control voltages from an A.-C. signal of varying amplitude. The A.-C. signal is employed to modulate an auxiliary high frequency signal. One of the modulation products is isolated, rectified and filtered to remove residual high frequency ripple, thus providing the desired result without the introduction of intolerable time delay.

I claim as my invention:

1. The method of deriving, from a variable amplitude alternating voltage, a unidirectional voltage with variations in magnitude similar to and substantially simultaneous with the variations in amplitude of said alternating voltage, comprising the steps of producing a constant amplitude alternating voltage of relatively high frequency, modulating said high frequency voltage with said variable amplitude alternating voltage to provide at least two side-band frequency products, filtering said products to isolate one of said side band products, rectifying said isolated product, and filtering said rectified product to remove the high frequency components thereof.

2. The method of deriving, from a variable amplitude alternating voltage, a direct voltage with variations in magnitude and polarity simultaneous with and similar to the variations in amplitude and polarity of said alternating voltage, comprising the steps of providing a reference phase alternating voltage, modulating said reference phase voltage with said variable amplitude voltage separately in opposite polarities to produce second and third voltages related similarly in amplitude to the amplitude of said variable amplitude voltage and related oppositely in amplitude to the polarity of said variable amplitude voltage, providing a constant amplitude voltage of relatively high frequency, separately modulating said high frequency voltage with said second voltage and with said third voltage to provide two groups of modulation products, isolating components of a single frequency from said products, rectifying and filtering said isolated components, and combining said rectified and filtered components.

3. A system for converting variable amplitude alternating voltage to a variable magnitude direct voltage, including a source of reference phase alternating voltage, balanced modulator means arranged to modulate said reference phase voltage with said variable amplitude voltage, a source of relatively high frequency voltage, second balanced modulator means connected to said high frequency source and to said first balanced modulator means to modulate said high frequency voltage with the output of said first modulator means, filter means connected to said second modulator means to isolate single frequency components from the output thereof, rectifier means connected to said filter means, and second filter means in the output circuit of said rectifier means.

4. A system for converting a variable amplitude alternating voltage into a variable magnitude direct voltage with negligible time delay, including a source of relatively high frequency alternating voltage, balanced modulator means connected to said source to modulate said high frequency voltage with said low frequency voltage, filter means connected to the output circuit of said modulator means and arranged to isolate one component of the modulation products thereof, rectifier means connected to said filter means, and a second filter in the output circuit of said rectifier means arranged to remove the high frequency components in the output of said rectifier.

5. In a remote control system including a source of control signals comprising variable amplitude alternating voltage, a source of relatively high frequency voltage, modulator means arranged to modulate said higher frequency voltage with said control signal, means for isolating one component of the modulation products thereof, and rectifier means connected to rectify said component.

JAMES W. CONKLIN.